No. 737,746. PATENTED SEPT. 1, 1903.
L. E. KROTZ.
CHANGEABLE SPEED GEAR.
APPLICATION FILED DEC. 8, 1902.
NO MODEL. 2 SHEETS—SHEET 1.

Witnesses
E. J. Stewart
P. J. Elmore

L. E. Krotz, Inventor,
by C. A. Snow & Co.
Attorneys

No. 737,746. PATENTED SEPT. 1, 1903.
L. E. KROTZ.
CHANGEABLE SPEED GEAR.
APPLICATION FILED DEC. 8, 1902.
NO MODEL. 2 SHEETS—SHEET 2.

Witnesses
E. F. Stewart
F. F. Elmore

L. E. Krotz, Inventor
by C. A. Snow & Co.
Attorneys

No. 737,746. Patented September 1, 1903.

UNITED STATES PATENT OFFICE.

LINFORD ELLSWORTH KROTZ, OF VICTOR, COLORADO, ASSIGNOR OF TWO-THIRDS TO GORHAM T. SEABURY AND FREDERICK W. ROEDEL, OF CHEYENNE, WYOMING.

CHANGEABLE-SPEED GEAR.

SPECIFICATION forming part of Letters Patent No. 737,746, dated September 1, 1903.

Application filed December 8, 1902. Serial No. 134,395. (No model.)

*To all whom it may concern:*

Be it known that I, LINFORD ELLSWORTH KROTZ, a citizen of the United States, residing at Victor, in the county of Teller and State of Colorado, have invented a new and useful Changeable-Speed Gear, of which the following is a specification.

My invention relates to changeable-speed gearing, and is especially applicable to the driving-gear of a bicycle, and has for its object to produce a simple inexpensive device of this character which may be readily operated to produce high or low speed without change in the driving force and which may also be operated as a brake to stop the wheel.

To these ends the invention comprises in a changeable gear a fixed hub or member, a crank journaled therein, a loosely-mounted central or sun pinion, a sprocket or drive wheel having an internal gear, a planetary pinion operatively connected with the crank to be driven thereby and in mesh with the sun-pinion and internal gear, and a lever-operated clutch adapted to engage and hold the sun-pinion, whereby the planetary pinion will revolve around the same and drive the sprocket.

The invention further comprises the details of construction and combination of parts hereinafter described.

Figure 1:
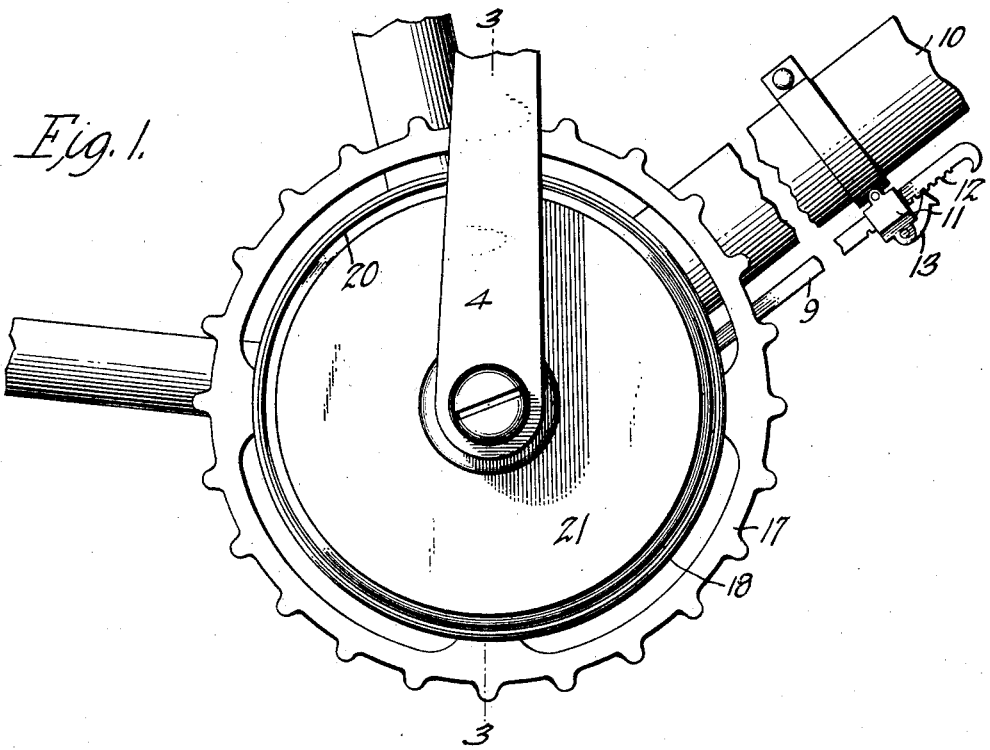
Figure 2:
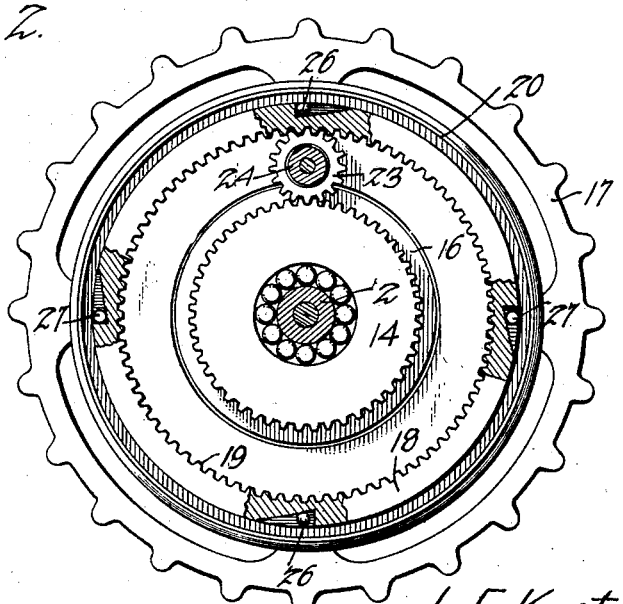
Figure 3:
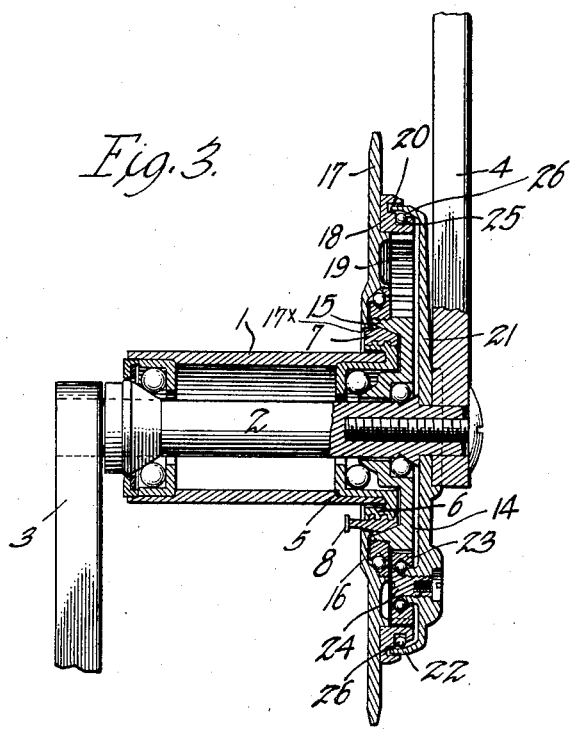
Figure 4:
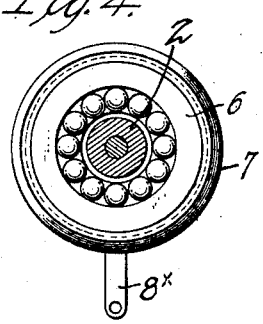

In the accompanying drawings, Figure 1 is a side elevation of a portion of a bicycle-frame having my improved gear applied thereto. Fig. 2 is a similar view of the gear alone, having the dust-cap removed to expose the internal parts to view, parts being in section. Fig. 3 is a vertical section through the gear on the line 3 3 of Fig. 1 with the dust-cap in place. Fig. 4 is an end elevation of the hub, having all the mechanism removed except the friction-clutch.

Referring to the drawings, 1 indicates the ordinary fixed hub of a bicycle having antifrictionally mounted therein for rotation the usual journal or crank-hanger 2, upon the opposite ends of which are mounted the driving-cranks 3 and 4.

5 is a cap screwed into or otherwise secured to the sprocket end of the hub. This cap is provided with a horizontal inwardly-extending threaded flange 6, upon which is screwed a friction-clutch 7, having its outer horizontal face beveled from its center laterally and downwardly to its inner and outer edges, as shown in Fig. 3. This clutch is provided with a rigid horizontal inwardly-extending arm 8, pivotally attached by link $8^\times$ to the lower end of a rod 9, which extends upward along the under side of the front frame-bar 10 and is mounted in suitable bearings 11 on the bar. The upper end of the rod 9 is adapted to be attached to the usual brake-lever carried by the handle-bar of the machine, by which the rod may be moved up and down to screw the friction-clutch 7 back and forth along the flange 6 for the purpose hereinafter explained. The upper end of rod 9 is provided with a series of teeth 12, engaged by a spring-dog 13 to hold the rod in its various positions.

14 is a toothed central or sun pinion mounted loosely at the end of the hub and antifrictionally supported by the journal 2. This pinion is provided with a horizontal inwardly-extending flange 15, having its inner face beveled to conform to the outer bevel on the face of the friction-clutch 7 and having screwed upon its outer face a ball runner or raceway 16, which antifrictionally supports the sprocket or other drive wheel 17. The sprocket-wheel is provided with a central circular opening within which the friction-clutch 7 projects, and the inner face $17^\times$ of the sprocket-wheel is beveled to register with the inner bevel on the face of the clutch.

18 is a horizontal flange formed entirely around the outer vertical face of the sprocket-wheel 17. This flange has gear-teeth 19 formed in its inner horizontal face and a groove 20 formed on its outer face.

21 is a dust-cap fixed with relation to and driven by the journal 2. This dust-cap is provided with a horizontal inwardly-extending peripheral flange 22, seated at its inner edge in the groove 20, above alluded to. This cap entirely covers the outer face of the gearing and protects the internal mechanism from dust or the like.

23 is a planetary pinion mounted loosely and antifrictionally upon a horizontal axle 24, carried by the inner vertical face of the dust-cap near its periphery. This pinion, which is driven through the medium of the dust-cap, meshes with the internal gear 19, carried by the sprocket-wheel, and with the central loose pinion 14.

In the peripheral face of the flange 18 I form four short recessed grooves 25, having inclined roughened bottoms, as shown in Fig. 2. Each of these recesses is provided with either an antifriction-ball 26 or an antifriction-roller 27, which serve when desired during the operation of the device to wedge between the inclined bottom of the recess and the overlying flange 22 of the dust-cap and lock the latter and the sprocket 17 together for the purpose to be presently explained.

The operation is as follows: Supposing the center pinion to be in its loose or idle condition, the rider by pressing downward on the rod 9 will screw the friction-clutch outward until it engages and clutches the said pinion and prevents rotation of the same. The dust-cap being fixed with relation to the journal 2 and crank 4 will be positively driven by and at the same rate of speed as the latter, while the planetary pinion 23, being mounted on an axis fixed to the dust-cap, will be positively driven through the medium of the latter and will revolve around the now fixed center pinion, at the same time rotating on its own axis, and will, through the medium of inner gear 19, impart to the sprocket-wheel a high rate of speed. Now to change the speed the rod 9 is drawn up, which screws the clutch back out of engagement with and releases the center pinion, and the sudden reduction in the speed of the sprocket causes the balls in the recessed grooves 25 to bind against the flange 22 of the dust-cap, thus locking the sprocket to the dust-cap and causing them to travel at the same rate of speed. With the parts in this position if pedaling be stopped it will release the sprocket from the dust-cap and permit its free rotation independent of the operation of the cranks for coasting. Now if the rod 9 be drawn up still further it will screw the clutch back until it engages and clutches the sprocket-wheel by engaging its beveled face 17×, thus stopping the operation of the machine.

It is to be understood that I do not limit or confine myself to the precise details herein described, as such changes as may suggest themselves to the skilled mechanic may be made without departing from the spirit or scope of my invention.

Having thus described my invention, what I claim is—

1. In a changeable-speed gear, the combination with a fixed hub or member, of a crank journaled therein, a loosely-mounted central or sun pinion, a drive-wheel having an internal gear, a planetary pinion operatively connected with the crank to be driven thereby and in mesh with the sun-pinion and internal gear, and a lever-operated clutch mounted on the hub and operable to engage and hold the sun-pinion, whereby the planetary pinion will revolve around the same and drive the sprocket at high speed.

2. In a changeable-speed gear, the combination with a fixed hub or member, of a crank journaled therein, a loosely-mounted central or sun pinion, a drive-wheel loosely mounted for rotation and having an internal gear, a planetary pinion operatively connected with the crank to be driven thereby and in mesh with the sun-pinion and internal gear, means for imparting to the drive-wheel a rate of speed equal to that of the crank and a lever-operated clutch adapted to be moved into engagement with the sun-pinion to change the speed or with the drive-wheel to brake the machine.

3. In a changeable-speed gear, the combination with a fixed hub or member of a crank journaled therein, a drive-wheel loosely mounted for rotation, a dust-cap adapted to be driven by the crank, mechanism adapted to be thrown into operation to impart high speed to the drive-wheel, and means independent of said mechanism for locking the dust-cap to the drive-wheel to impart low speed to the same.

4. In a changeable-speed gear, the combination with a fixed hub or member of a crank journaled therein, a drive-wheel loosely mounted for rotation and having a horizontal flange, ball-sockets formed in the flange, a dust-cap adapted to be driven by the crank and having a flange adapted to overlap the flange on the drive-wheel, mechanism adapted to be thrown into operation to impart high speed to the drive-wheel, and balls mounted in the ball-sockets and adapted to lock the dust-cap to the drive-wheel to impart low speed to the same.

5. In a changeable-speed gear, the combination with a fixed hub or member, of a crank journaled therein, a loosely-mounted central or sun pinion, a drive-wheel having an internal gear, a planetary pinion in mesh with the sun-pinion and internal gear, a dust-cap driven by the crank and imparting motion to the planetary pinion, a clutch adapted to engage the sun-pinion to impart high speed to the drive-wheel, and means independent of said clutch for locking the dust-cap to the drive-wheel to impart low speed to the latter.

In testimony that I claim the foregoing as my own I have hereto affixed my signature in the presence of two witnesses.

LINFORD ELLSWORTH KROTZ.

Witnesses:
MARY LONERGAN,
KITTIE CUNNINGHAM.